US012151842B2

(12) United States Patent
Wallman-Carlsson et al.

(10) Patent No.: US 12,151,842 B2
(45) Date of Patent: Nov. 26, 2024

(54) CASH BAG SEALING DEVICE, A CASH DEPOSITING SYSTEM AND A METHOD FOR CONTROLLING THE SAME

(71) Applicant: SCAN COIN AB, Malmö (SE)

(72) Inventors: Victor Wallman-Carlsson, Malmö (SE); Kristian Bengtsson, Bjärred (SE)

(73) Assignee: SCAN COIN AB, Malmö (SE)

(*) Notice: Subject to any disclaimer, the term of this patent is extended or adjusted under 35 U.S.C. 154(b) by 186 days.

(21) Appl. No.: 17/800,946

(22) PCT Filed: Feb. 18, 2021

(86) PCT No.: PCT/EP2021/053991
§ 371 (c)(1),
(2) Date: Aug. 19, 2022

(87) PCT Pub. No.: WO2021/165378
PCT Pub. Date: Aug. 26, 2021

(65) Prior Publication Data

US 2023/0073458 A1 Mar. 9, 2023

(30) Foreign Application Priority Data

Feb. 21, 2020 (EP) .................................... 20158757

(51) Int. Cl.
*B65B 51/14* (2006.01)
*B65B 57/02* (2006.01)
(Continued)

(52) U.S. Cl.
CPC ............ *B65B 51/146* (2013.01); *B65B 57/02* (2013.01); *G07D 11/125* (2019.01); *G07D 11/14* (2019.01); *G07D 11/22* (2019.01)

(58) Field of Classification Search
CPC ................ B65B 51/146; G07D 11/009; G07D 11/0096; G07D 11/125; G07D 11/14; G07D 11/16; G07D 11/20; G07D 11/12
(Continued)

(56) References Cited

U.S. PATENT DOCUMENTS

2008/0073177 A1 3/2008 Hansson
2013/0213763 A1* 8/2013 Rao ........................ G07D 11/12 194/350
(Continued)

FOREIGN PATENT DOCUMENTS

| | | | | |
|---|---|---|---|---|
| EP | 3276580 A1 * | 1/2018 | ........... | G07D 11/009 |
| KR | 101781029 * | 10/2017 | ......... | G07D 11/0096 |
| WO | WO-2012115028 A1 * | 8/2012 | ............. | B65B 25/14 |

OTHER PUBLICATIONS

International Search Report for PCT/EP2021/053991, Prepared by the European Patent Office, mailing date Apr. 21, 2021, 2 pages.
(Continued)

*Primary Examiner* — Stephen F. Gerrity
*Assistant Examiner* — Linda J Hodge
(74) *Attorney, Agent, or Firm* — Brooks Kushman P.C.

(57) ABSTRACT

The disclosure relates to a cash bag sealing device for retaining and sealing a cash bag into which cash can be deposited and stored, wherein said cash bag sealing device having a supporting structure onto which two sealing jaws are oppositely arranged and of which at least one is reciprocally moveable between a sealing position and an open position and wherein at least one sealing jaw includes a heating element, the cash bag sealing device being configured to form a seal in the cash bag by the reciprocally moveable sealing jaw pressing the cash bag against the other sealing jaw in the sealing position and by heating said
(Continued)

heating element, and wherein at least one of the sealing jaws includes at least one cash bag fastener.

17 Claims, 7 Drawing Sheets

(51) Int. Cl.
*G07D 11/125* (2019.01)
*G07D 11/14* (2019.01)
*G07D 11/22* (2019.01)

(58) Field of Classification Search
USPC ............ 232/43.2; 53/284.7, 373.7, 469, 570, 53/384.1
See application file for complete search history.

(56) References Cited

U.S. PATENT DOCUMENTS

2013/0305540 A1 11/2013 Ruddell et al.
2018/0305048 A1 10/2018 Nishimura et al.
2020/0115082 A1 * 4/2020 Hess ..................... B65B 43/267
2024/0076073 A1 * 3/2024 Wright ............... G07D 11/0093

OTHER PUBLICATIONS

Argentinian Office Action for Application No. 20210100396, Preliminary to Exam, Dated: Mar. 27, 2024, 3 pages.
Chilean Office Action First Examination Report, Dated: Mar. 8, 2024, 14 pages.
Colombian Office Action for Columbian Application No. 2022/0013260, dated May 27, 2024, 12 pages.

* cited by examiner

CASH BAG SEALING DEVICE, A CASH DEPOSITING SYSTEM AND A METHOD FOR CONTROLLING THE SAME

CROSS-REFERENCE TO RELATED APPLICATION

This application is the U.S. national phase of PCT Application No. PCT/EP2021/053991 filed on Feb. 18, 2021, which claims priority to EP patent application Ser. No. 20/158,757.3 filed on Feb. 21, 2020, the disclosures of which are incorporated in their entirety by reference herein.

FIELD OF THE INVENTION

The present invention relates to handling of currency, more specifically handling of cash. The present invention relates to a cash bag sealing device, to a cash depositing system comprising a cash bag sealing device and to a method for controlling a cash depositing system.

BACKGROUND ART

Handling of currency in the form of cash is a large business in many countries throughout the world and a business that for obvious reasons dictates high levels of safety and accuracy. There has been a great deal of developments in the field to achieve these now established levels of security and accuracy by the provision of apparatuses and systems that more or less automatically handles deposited money. For instance, devices for counting deposited money exists, both for coins and for bills. The cash that has been deposited is generally stored in a container of some sort. The container can be embodied in a number of ways, not only depending on if it is coins or bills that is being handled.

Bills may for instance be stored either in organized bundles that are placed in a container/cassette adapted after shape of the bills. Alternatively, bills may be stored in a container in the form of a bag that is sealable such that the money cannot be accessed without compromising the bag. The container may then be transported by a cash handling service provider. The teachings herein relate specifically to devices for storing cash in sealable bags, hereafter called cash bags.

The cash bags are often manufactured out of a plastic or polymeric material in which the seal is generated by heating and at least partially melting the material in order to generate a welded seal. The seal should preferably be performed in an automated fashion by the apparatus into which the cash is deposited, such that the cash bag is sealed when the apparatus is accessed by a person that will subsequently transport the money.

Manufacturers of devices/apparatuses/systems for handling cash continuously strive to improve on prior art solutions by providing devices for handling cash bags having improved reliability, higher degree of automation and improved safety.

SUMMARY OF THE INVENTION

In view of that stated above, the object of the present invention is to provide a cash bag sealing device, a cash depositing system and a method for controlling a cash depositing system that alleviates at least some of the problems with prior art solutions.

More specifically, there is provided according to the present invention a cash bag sealing device for retaining and sealing a cash bag into which cash can be deposited and stored. The cash bag sealing device comprises a supporting structure onto which two sealing jaws are oppositely arranged and of which at least one is reciprocally moveable between a sealing position and an open position and at least one sealing jaw comprises a heating element. The cash bag sealing device is configured to form a seal in the cash bag by the reciprocally moveable sealing jaw pressing the cash bag against the other sealing jaw in the sealing position and by heating said heating element. At least one of the sealing jaws comprises at least one cash bag fastener, the at least one cash bag fastener being moveable between an open position in which the cash bag is releasable and a closed position in which the cash bag is retained. The at least one cash bag fastener is configured to move into its open position when the reciprocally moveable sealing jaw leaves the sealing position after the cash bag has been sealed. The cash bag fastener will consequently automatically release the cash bag when the sealing jaw moves into its open position, removing the need for an operator to manually release the cash bag from the sealing jaws before the sealing jaw(s) can be moved into the open position such that the bag can be removed. When the cash bag is sealed, it will not be possible to move the sealing jaw(s) to the open position with the cash bag still attached to the cash bag fasteners without ripping the bag and/or compromising the seal. The cash sealing device allows the entire sealing process and movements of the at least one reciprocally moveable sealing jaw to be performed while avoiding that the cash bag is compromised.

The movement of the cash bag fastener may be controlled by the movement of the reciprocally moveable sealing jaw, removing the need for any dedicated control means for operating the cash bag fastener.

The at least one cash bag fastener may further be in the shape of a clamp, the clamp comprising a clamping portion configured to clamp the cash bag towards a clamp engagement portion of the cash bag sealing device when the cash bag fastener is in the closed position. The clamping portion facilitates attachment of a cash bag to the fastener.

The at least one cash bag fastener may be biased into its closed position by means of a spring. No active control of the closing movement of the cash bag fastener is thus need, the spring may in one embodiment bias the clamping portion into it the closed position.

In one embodiment, the cash bag sealing device comprises at least one cash bag fastener control mechanism having a moveable portion arranged on the supporting structure. The movable portion is moveable between a retracted position and an extended position in relation to the supporting structure. The moveable portion is configured to be arranged in its extended position when the reciprocally movable sealing jaw moves towards the open position from the sealing position, whereby the moveable portion holds the cash bag fastener in its open position for at least a portion of the length of the movement of the reciprocally moveable sealing jaw from the sealing position to the open position. Preferably, one cash bag fastener control mechanism is provided for each cash bag fastener. The cash bag control mechanism facilitates control of the opening and closing of the cash fastener as a function of the movement direction and position of the sealing jaw(s).

The moveable portion may be pivotable in relation to the supporting structure between its retracted and extended position and biased by a spring into its extended position, the at least one cash bag fastener pushing against a first cam surface on the moveable portion thereby forcing the moveable portion into the retracted position during the movement from the open position to the sealing position of the reciprocally moveable sealing jaw. The moveable portion can thus be pushed out of the way of the respective cash bag fastener when the sealing jaw moves to the sealing position.

Further still, the first cam surface may extend such that the moveable portion returns to its extended position when the at least one reciprocally moveable sealing jaw is in or close to the sealing position. The moveable portion may consequently engage the cash bag fastener once the sealing jaw(s) moves towards the open position.

In one embodiment the moveable portion comprises a second cam surface configured to engage the at least one cash bag fastener to hold said cash bag fastener in its open position for at least a portion of the length of the movement of the at least one reciprocally moveable sealing jaw from the sealing position to the open position. Preferably, the interaction between the cash bag fastener and the second cam surface opens the cash bag fastener in close proximity of the sealing position of the sealing jaw when the sealing jaws moves towards its open position. This facilitates reliable and automated release of the cash bag from the fastener.

The cash bag fastener may comprise a protrusion forming a lever arm configured for engagement with the moveable portion. The lever arm may in one embodiment be connected to the clamping portion of the cash bag fastener.

The clamp engagement portion may further comprise a retaining protrusion configured to be arranged in a corresponding indentation in the clamping portion when the clamping portion is in its closed position. The retaining force on the cash bag by the cash bag fastener can thus be improved, reducing the risk of unintentional release of the cash bag as well as increasing the weight of the cash that can be stored in the cash bag.

The indentation may in one embodiment comprise a protrusion configured to be arranged in a corresponding recess on the retaining protrusion, further improving the retaining force of the cash bag fastener.

Each cash bag fastener may further comprise a cash bag detection sensor configured for detection of if a cash bag is being retained by the cash bag fastener. The cash bag detection sensor facilitates detection of if the cash bag releases as intended from the cash bag fastener and that the cash bag is being retained when the sealing jaw(s) are in the open position and cash is being deposited into the cash bag.

In one embodiment, the cash bag detection sensor comprises a first and a second connector arranged on the clamping portion. The first and second connectors being electrically connected to each other.

The clamp engagement portion may further comprise a third and fourth connector which are electrically insulated from each other. The third and fourth connectors are arranged such that the first and second connectors will make electrical contact with the third and fourth connector respectively such that an electrical connection is formed between the third connector and the fourth connector when no cash bag is retained by the fastener.

In one embodiment, one of the third or fourth connector is connected to an electrical power source and one of the third and fourth connector is connected to ground.

In one embodiment, one of the third or fourth connector is connected to a controller of the cash depositing system for detecting of if a cash bag is being retained by the respective fastener.

Each sealing jaw may further comprise two cash bag fasteners.

Moreover, each sealing jaw may be reciprocally moveable such that the sealing jaws move in the opposite direction to meet in the sealing position.

In a second aspect, a cash depositing system is provided which is configured for receiving and storing cash preferably in the shape of bills. The cash depositing system comprises a cash receiving device, a cash storing container and a cash bag sealing device according to the first aspect for retaining and sealing a cash bag arranged in the cash storing container. The cash depositing system facilitates handling of the cash bag, as it allows the cash bag to filled with deposited cash, sealed and then release by the sealing jaws without in an automated fashion. Reducing the need for any operator to manually release the cash bag improves the safety and improves the efficiency of the cash bag collection process as it reduces the man hours necessary for the operator.

The cash bag sealing device may be moveable in relation to the cash storing container such that it can be extended outside an openable hatch in said cash storing container, facilitating collection of the cash bag.

In a third aspect is a method for controlling a cash depositing system according to second aspect provided. The method comprises: receiving a signal to seal the bag, moving the at least one moveable sealing jaw into the sealing position and activating the heating element and moving the at least one moveable sealing jaw into the open position and deactivating the heating element. The cash bag is then ready to be collected, being sealed by the sealing jaws and released in an automated fashion.

In one embodiment, each cash bag fastener comprises a cash bag detection sensor and the method further comprises detecting if the cash bag releases from each cash bag fastener when the at least one moveable sealing jaw moves towards the open position.

The detecting may further comprise monitoring continuously if the cash bag is attached to each cash bag fastener when each cash bag fastener is in its closed position, facilitating the detection of unintentional release of the cash bag from the cash bag fasteners.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
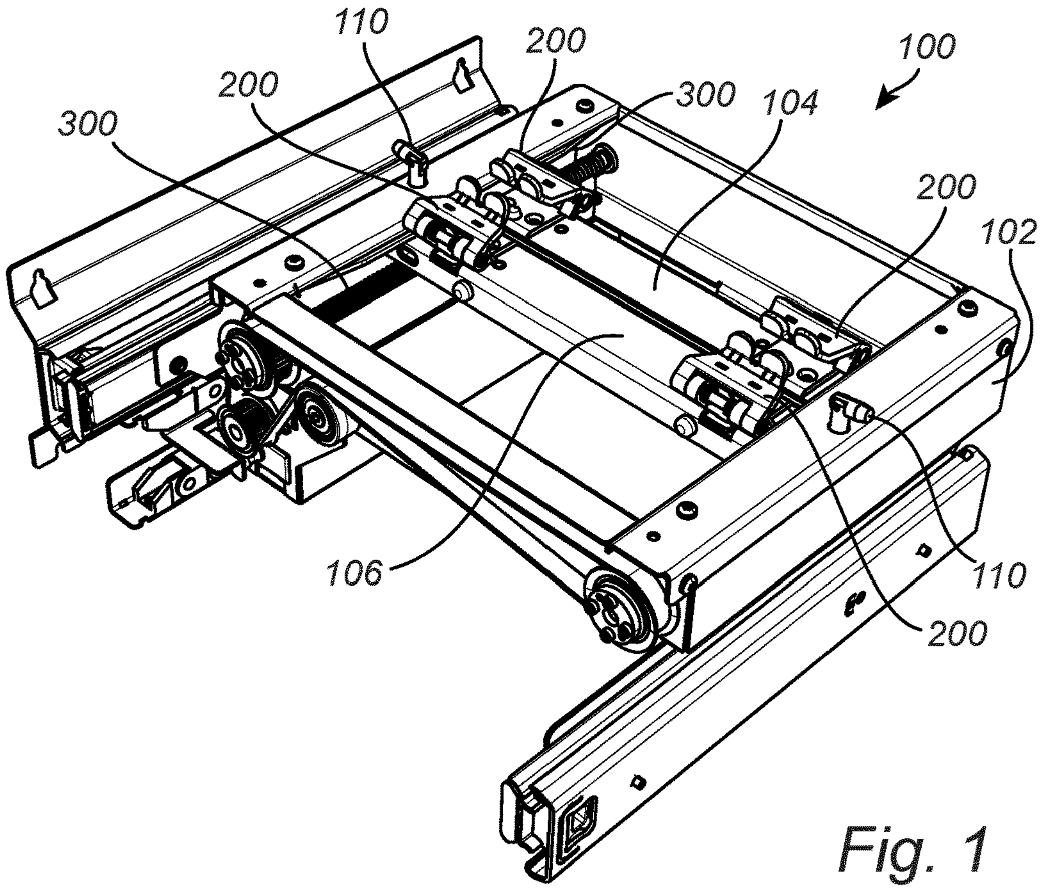
FIG. 1 discloses a perspective view of a cash bag sealing device with sealing jaws in a sealing position.
Figure 2:
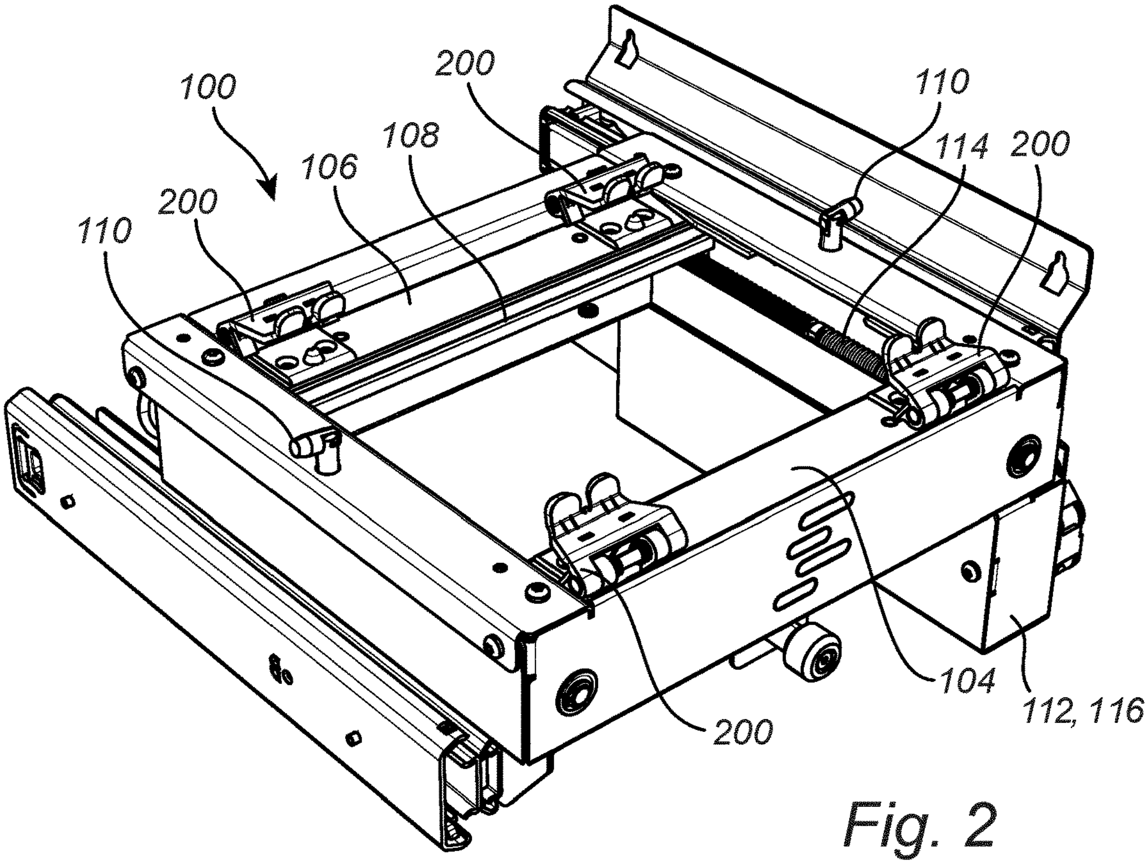
FIG. 2 discloses a perspective view of a cash bag sealing device with sealing jaws in an open position.

Referring firstly to FIGS. 1 and 2, in which a cash bag sealing device 100 is shown. The cash bag sealing device 100 is intended for retaining and sealing a cash bag 1 (shown in FIG. 12) into which cash can be deposited and stored. The cash bag 1 is preferably made out of a plastic or polymeric material, preferably a thermoplastic material such as LDPE.

The cash bag sealing device 100 comprises a supporting structure 102. The supporting structure 102 forms a frame having a rectangular shape and is preferably manufactured from a metallic material such as steel or aluminium. The supporting structure 102 may be formed from a plurality of folded sheet metal elements that are attached together to form the frame. The supporting structure 102 may however be formed in other ways as well, the teachings herein are not limited to any particular material or manufacturing method of the supporting structure 102.

The supporting structure 102 however supports two sealing jaws 104, 106 which are oppositely arranged and of which at least one is reciprocally moveable between a sealing position and an open position. In FIG. 1, the sealing jaws 104, 106 are shown in the sealing position in which the two sealing jaws 104, 106 are arranged in close proximity or in abutment against each other. In a preferred embodiment, both sealing jaws 104, 106 move essentially equidistantly to meet in the sealing position.

At least one sealing jaw 104, 106 comprises a heating element 108. The heating element 108 is a preferably an electric heating element 108 and could as such be formed in many ways. Preferably however, the heating element 108 is a resistive heating element. The heating element 108 is configured to be heated to a temperature which is sufficient for the material of cash bag 1 to at least partially melt and thus form a seal in the cash bag 1. In one embodiment, the heating element 108 on one sealing jaw 104, 106 is configured to cooperate with a resilient abutment element (not shown) arranged on the opposite sealing jaw 104, 106. Such a resilient abutment element could for instance be a strip of open cell foam material.

The reciprocally moveable sealing jaw 104, 106 facilitates the sealing of the cash bag by pressing the cash bag against the other sealing jaw 104, 106 in the sealing position, the heating element 108 is heated in conjunction with the pressing by the sealing jaws 104, 106 such that the heat and pressure generated forms a seal in the cash bag 1. The cash bag sealing device 100 may for achieving the movement of the of the at least one reciprocally moveable sealing jaw 104, 106 comprise a sealing jaw control mechanism 112, 114. The sealing jaw control mechanism 112, 114 may comprise a drive unit 112, preferably an electric motor but it may also be a pneumatic or hydraulically powered drive unit. The sealing jaw control mechanism may further comprise a threaded member 114 which is rotatable in either direction by means of the drive unit 112. The rotation direction of the threaded member determines the direction of movement of the at least one reciprocally moveable sealing jaw 104, 106. In one embodiment as mentioned, both sealing jaws 104, 106 are reciprocally moveable and thus connected to opposite sides of the threaded member 114. The threaded member 114 is in such an embodiment threaded such that the sealing jaws 104, 106 moves in the opposite direction in relation to one another when the threaded member rotates in one direction. The reciprocal movement of the sealing jaw(s) 104, 106 is guided by the supporting structure 102. Other means for achieving a linear reciprocal movement of the at least one reciprocally moveable sealing jaw 104, 106 are also considered, such as having one drive unit 112 and one threaded member 114 for each sealing jaw 104, 106 and/or using a linear actuator etc. The teachings herein are not limited to any particular means for achieving the linear movement of the sealing jaw(s) 104, 106.

In one embodiment, the cash bag sealing device 100 further comprises a controller 116 for controlling the movement of the sealing jaw(s) 104, 106 and the heating of the heating element 108. The controller 116 of the cash bag sealing device 100 may further be configured to communicate with a controller 410 of a cash bag depositing system 400.

The controller 116 may further comprise a control unit which may be associated with a memory. The control unit may include a control circuit and an associated processor, such as a central processing unit (CPU), microcontroller, or microprocessor. The processor being configured to execute program code stored in the memory, in order to carry out functions and operations of the cash bag sealing device 100.

The memory may be one or more of a buffer, a flash memory, a hard drive, a removable media, a volatile memory, a non-volatile memory, a random access memory (RAM), or another suitable device. In a typical arrangement, the memory may include a non-volatile memory for long term data storage and a volatile memory that functions as system memory for the control unit. The memory may exchange data with the control unit over a data bus. Accompanying control lines and an address bus between the memory and the control unit also may be present.

The control unit may further comprise a communication unit, connected to the control circuit, configured to allow control of the cash bag sealing device 100 remotely and/or as a part of a cash depositing system 400. The communication path over which the communication is made may be wired or wireless. The communication may include data transfers, and the like. Data transfers may include, but are not limited to, downloading and/or uploading data and receiving or sending messages. The data may be processed by the control unit. The processing may include storing the data in a memory, e.g. the memory of the control unit, executing operations or functions, and so forth.

Functions and operations of the control unit may be embodied in the form of executable logic routines (e.g., lines of code, software programs, etc.) that are stored on a non-transitory computer readable medium (e.g., the memory) of the control unit and are executed by the control circuit (e.g., using the processor). Furthermore, the functions and operations of the control unit may be a stand-alone software application or form a part of a software application that carries out additional tasks related to the control unit. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

At least one of the sealing jaws 104, 106 comprises at least one cash bag fastener 200. In one embodiment, which is illustrated in FIGS. 1 and 2, each sealing jaw 104, 106 comprises two cash bag fasteners 200. Each sealing jaw 104, 106 could be also provided with three or more fasteners depending on the application. Further still, the sealing jaws 104, 106 does not necessarily have to be provided with equal numbers of cash bag fasteners 200.

Figure 5:
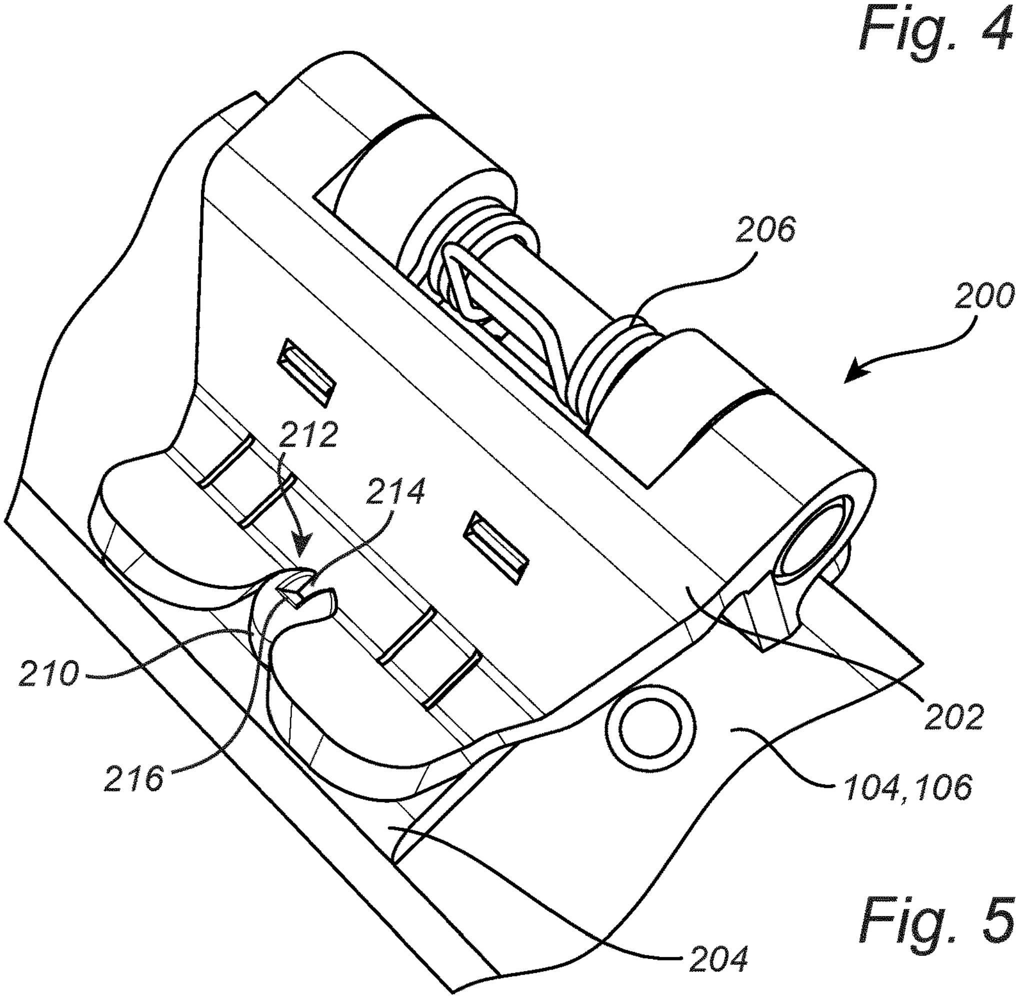
FIG. 5 discloses a detail view of a cash bag fastener in its closed position.
Figure 6:
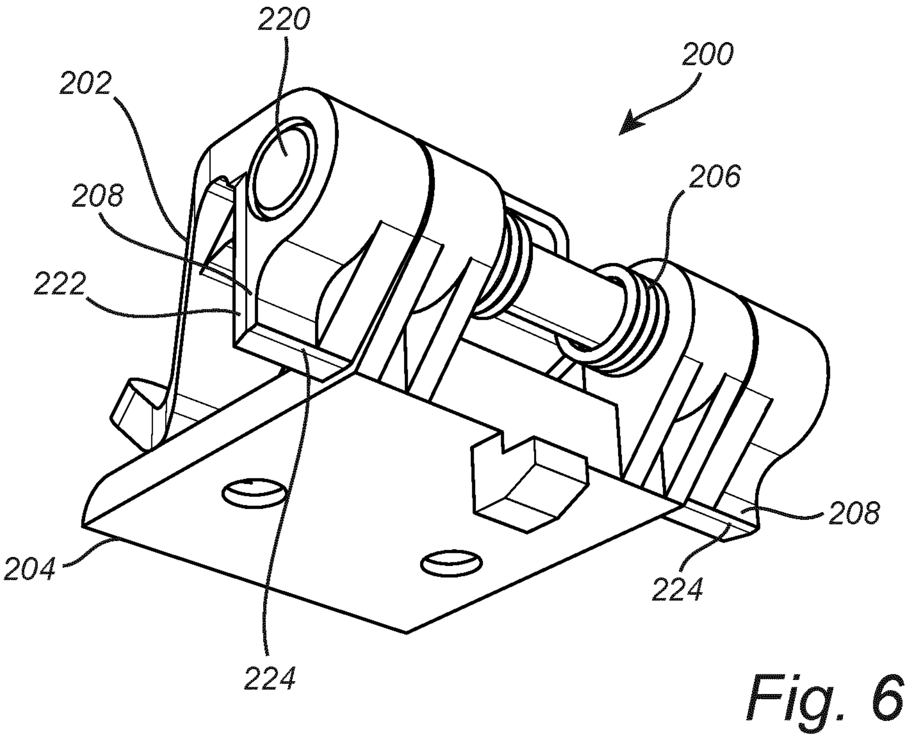
FIG. 6 discloses a rear perspective view of a cash bag fastener.

The at least one cash bag fastener 200 is moveable between an open position, which is the position that the fasteners 200 shown in FIGS. 1 and 2 are shown in, and a closed position (shown in FIGS. 5 and 6). In the open position, the cash bag 1 can be attached and released to/from each of the fasteners 200. Typically, the sealing jaws 104, 106 are arranged in their open position or a partially open position to allow insertion of a new cash bag 1 between the sealing jaws 104, 106. Each fastener 200 is manually brought into its open position, preferably one at the time, allowing the cash bag 1 to be arranged such that it is retained by the fastener 200 once it has been placed in its closed position.

The cash bag 1 is then retained by the cash bag fasteners 200 and is ready for receiving cash until it has been filled to a predetermined level, which could be defined either by weight or by a desired fill level of the cash bag 1 or by a set time or by manual control etc. The cash bag 1 will then be sealed by the sealing jaws 104, 106, the at least one reciprocally moveable sealing jaw 104, 106 moving into its sealing position to generate the seal in the cash bag 1.

The supporting structure 102 may in one embodiment further comprise oppositely arranged cash bag hooks 110, the cash bag hooks 110 preferably being arranged in the position on the supporting structure 102 where the sealing jaws 104, 106 meets in the sealing position. The cash bag hooks 110 being configured to hold the upper portion and the sides of the cash bag 1 that are not being retained by the cash bag fasteners 200 such that the cash bag 1 is held open as desired when the cash bag 1 is being filled with cash. The cash bag hooks 110 may further be configured to at least partially support the cash bag 1 when the cash bag fasteners 200 releases the cash bag 1 after the cash bag 1 has been sealed by the sealing jaws 104, 106. The cash bag 1 may be attached to the hooks 110 either by means of preformed holes in the cash bag 1 or by pushing the cash bag 1 onto the cash bag hooks 110 such that holes are formed in the cash bag 1.

Figure 3:
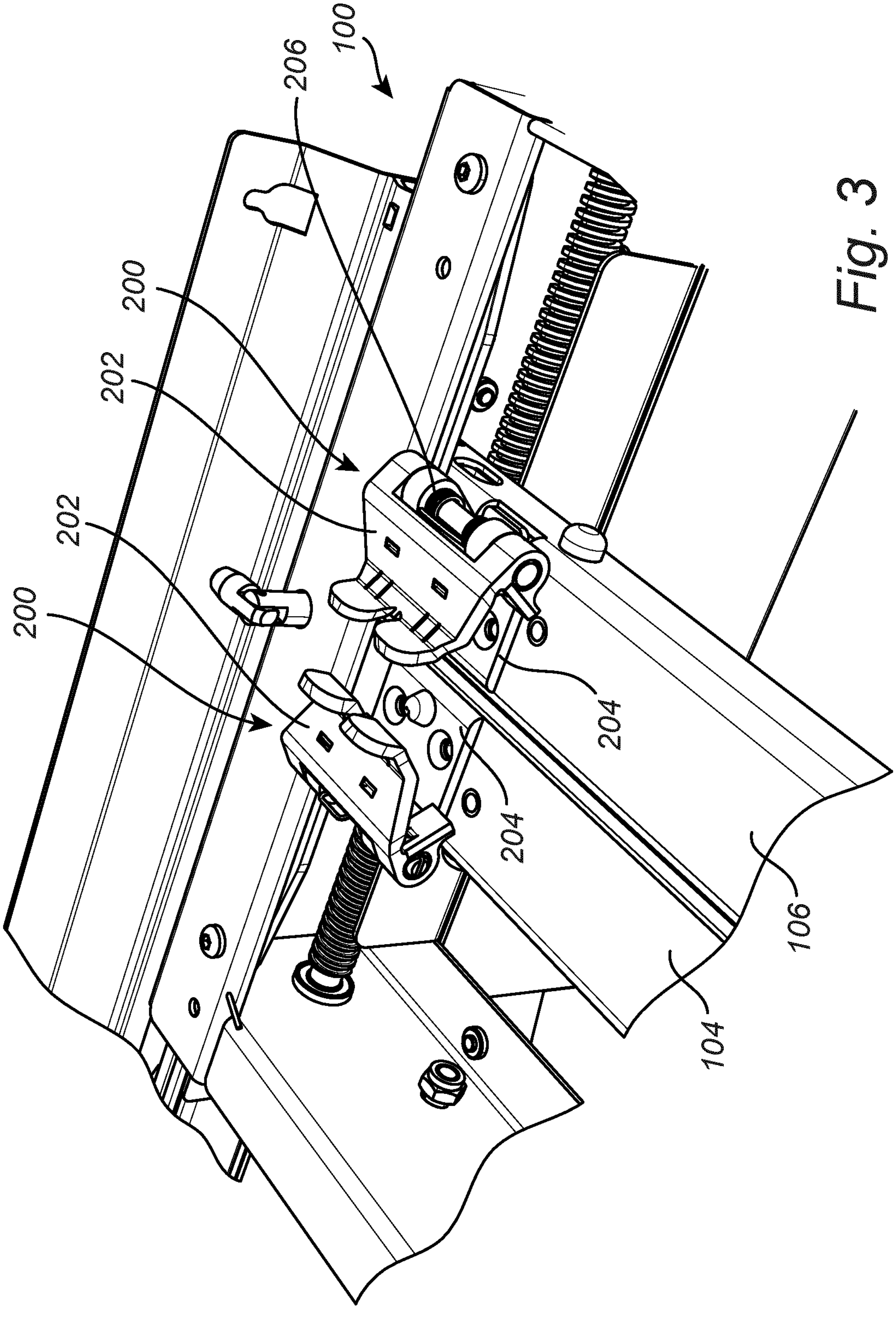
FIG. 3 discloses a detail view of a cash bag sealing device showing two cash bag fasteners.

Turning now to FIG. 3, in which the sealing jaws 104, 106 are shown in the sealing position and the cash bag fasteners 200 in their open position. The cash bag fasteners may in one embodiment be in the shape of a clamp 200. The clamp 200 comprises a clamping portion 202 configured to clamp the cash bag 1 towards a clamp engagement portion 204 of the cash bag sealing device 100 when the cash bag fastener 200 is in the closed position. The clamping portion 202 is moveable between the open and closed position and may be biased into its closed position by means of a spring 206. The spring 206 should provide a sufficiently high force that provides for that the cash bag 1 is held in place, while not having such a high force that the clamping portion 202 cannot manually be placed in the open position by an operator. The clamp engagement portion 204 may be formed by the respective sealing jaw 104, 106 to which the fastener 200 is attached. I.e. the clamping portion 202 may be pivotably attached directly to the respective sealing jaw 104, 106. Preferably however, the clamp engagement portion 202 is a separate part attached to the clamping portion 202 by means of a hinge 220 which is shown in FIG. 4.

Figure 4:
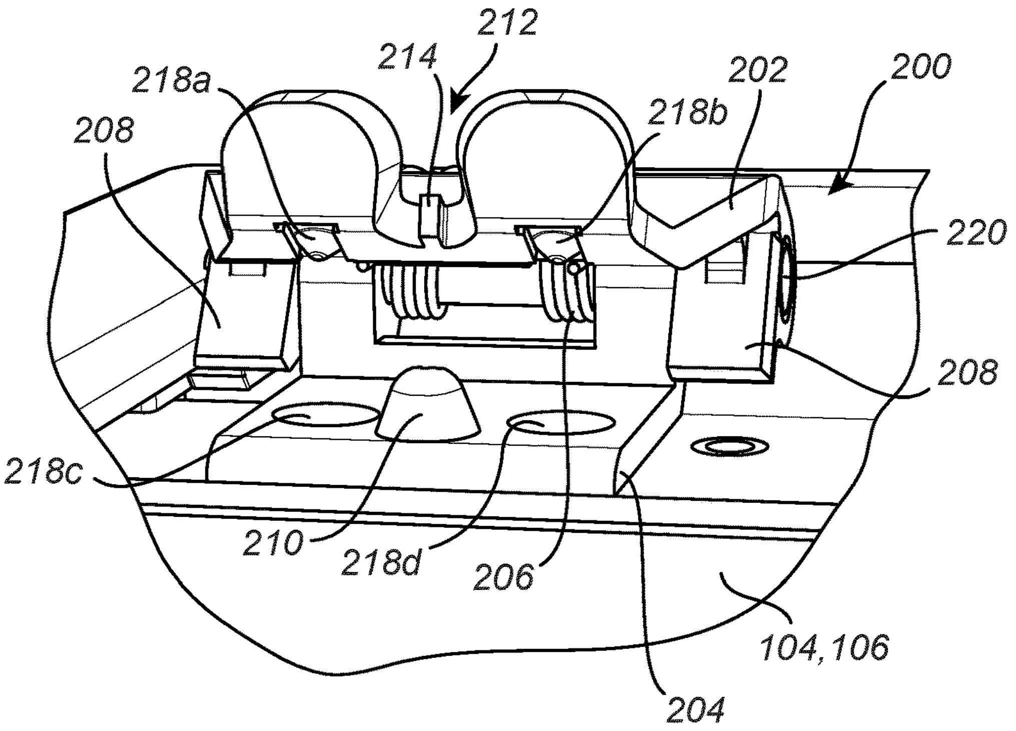
FIG. 4 discloses a detail view of a cash bag fastener in its open position.

With continued reference to FIG. 4, in which a cash bag fastener 200 is shown in further detail, it can be seen that the clamp engagement portion 204 may comprise a retaining protrusion 210 configured to be arranged in a corresponding indentation 212 in the clamping portion 202 when the clamping portion 202 is in its closed position. The retaining protrusion 210 is shown having a conical shape with a rounded tip, and the indentation 212 in the clamping portion 202 being formed by a cut-out having a corresponding shape. Other corresponding shapes are also envisioned, such as a cylindrical or pyramidal protrusion and corresponding indentation etc. The retaining protrusion 210 cooperates with the indentation 212 to increase the friction and thus the retaining force of the fastener 200 on the cash bag 1. In one embodiment, the cash bag 1 is provided with a hole for each corresponding cash bag fastener 200 such that the retaining protrusion 210 is arranged through the hole in the cash bag 1 when the cash bag 1 is being supported by the fasteners 200. The retaining protrusion 210 should however preferably have a tapering shape and/or at least be inclined towards the sealing position of the sealing jaws 104, 106 as this facilitates release of the cash bag 1 from each fastener 200 when the sealing jaw(s) 104, 106 moves away from the sealing position after having sealed the cash bag 1. The indentation 212 may in one embodiment be slightly larger than the retaining protrusion 210 such that a small gap is formed which facilitates closing the cash bag fastener 200 when a cash bag 1 is arranged in the fastener.

What can further be seen in FIG. 4 is that the fastener 200 may be provided with a cash bag detection sensor 218 configured for detection of if a cash bag 1 is being retained by the cash bag fastener 200. The cash bag detection sensor 218 is preferably an electrical switch in which electrical connection is made, which is detectable by the controller 116 of the cash bag sealing device 100 and/or by the cash depositing system controller 410, when the cash bag fastener 200 is in its closed position when there is no cash bag 1 attached. The cash bag 1 is preferably manufactured from a material that is not electrically conductive or at least has a low electrical conductivity such that the removal of the cash bag 1 is detectable by means of the cash bag detection sensor 218. In one embodiment, the cash bag detection sensor 218 comprises a first and a second connector **218*a*, 218*b* arranged on the clamping portion 202. The first and second connectors 218*a*, 218*b* are electrically connected to each other. The clamp engagement portion 204 may further comprises a third and fourth connector 218*c*, 218*d* which are electrically insulated from each other. The third and fourth connectors 218*c*, 218*d* are arranged such that the first and second connectors 218*a*, 218*b* will make electrical contact with the third and fourth connector 218***c*, 218*d* respectively such that an electrical connection is formed between the third connector 218*c* and the fourth connector 218*d* when no cash bag 1 is retained by the fastener 200. In one embodiment, one of the third or fourth connector 218*c*, 218*d* is connected to an electrical power source and one of the third and fourth connector 218*c*, 218*d* is connected to ground. In one embodiment, one of the third or fourth connector 218*c*, 218*d* is connected to the controller 116 of the cash bag sealing device 100 and/or to the controller 410 of the cash depositing system 400 for detecting of if a cash bag 1 is being retained by the respective fastener 200.

The cash bag detection sensor 218 may also be embodied as a proximity switch, for instance an IR-sensor could be used which detects the presence of a cash bag 1.

In FIG. 5, the cash bag fastener 200 is shown in its closed position with the retaining protrusion 210 arranged in the indentation 212 in the clamping portion 202. What is further shown is that the indentation 211 may be provided with a protrusion 214 which is configured to be arranged in a corresponding recess 216 on the retaining protrusion 210. The protrusion 214 in the indentation 212 is preferably arranged centrally in the indentation 212, the protrusion 214 in one embodiment extending vertically forming a vertically oriented rib. The recess 216 has a shape corresponding to that of the protrusion 214 and may thus be shaped as a vertically extending notch or groove in the retaining protrusion 210 on the side thereof facing towards the hinge 220 of the cash bag fastener 200. The recess 216 may be slightly larger than the protrusion 214, which facilitates closing the fastener 200 when a cash bag 1 is being retained by it.

Each fastener 200 may be manufactured from a plastic or polymeric material or from a metallic material such as steel or aluminium. Other materials are also considered, the cash bag fastener 200 described herein is not limited to any particular material or manufacturing method and could be formed in a plurality of ways.

Figure 7:
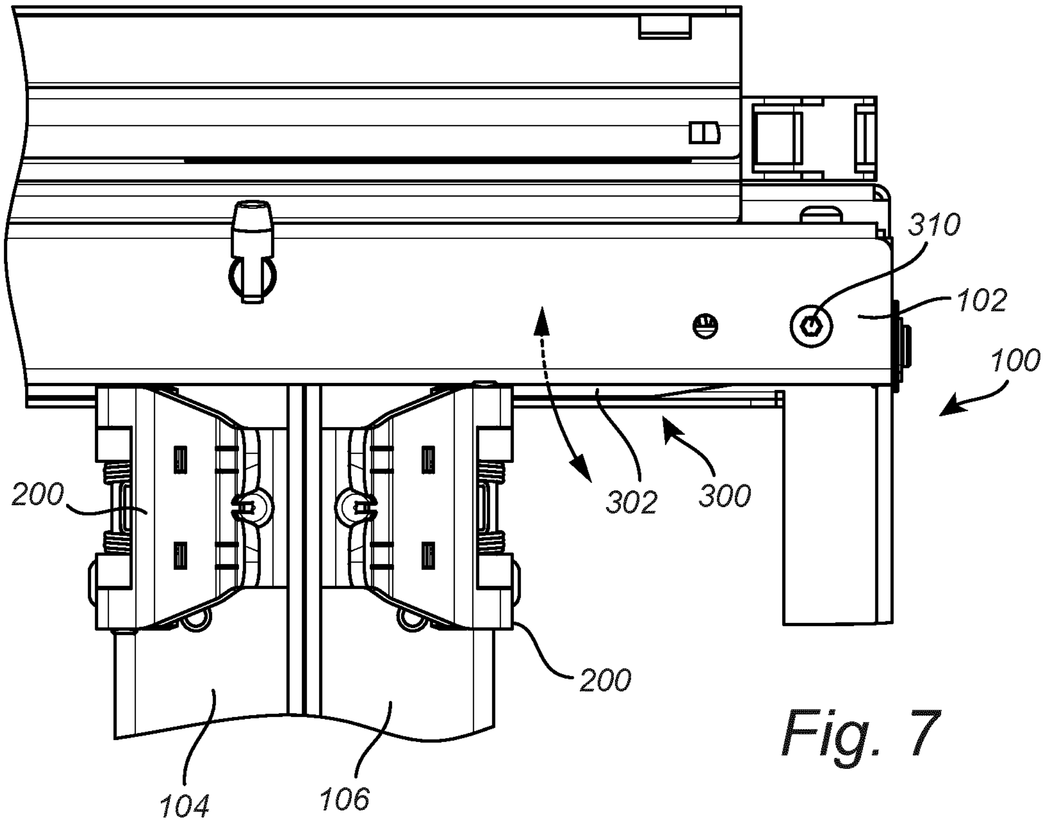
FIG. 7 discloses a top view of a cash bag sealing device and a cash bag fastener control mechanism.
Figure 8:
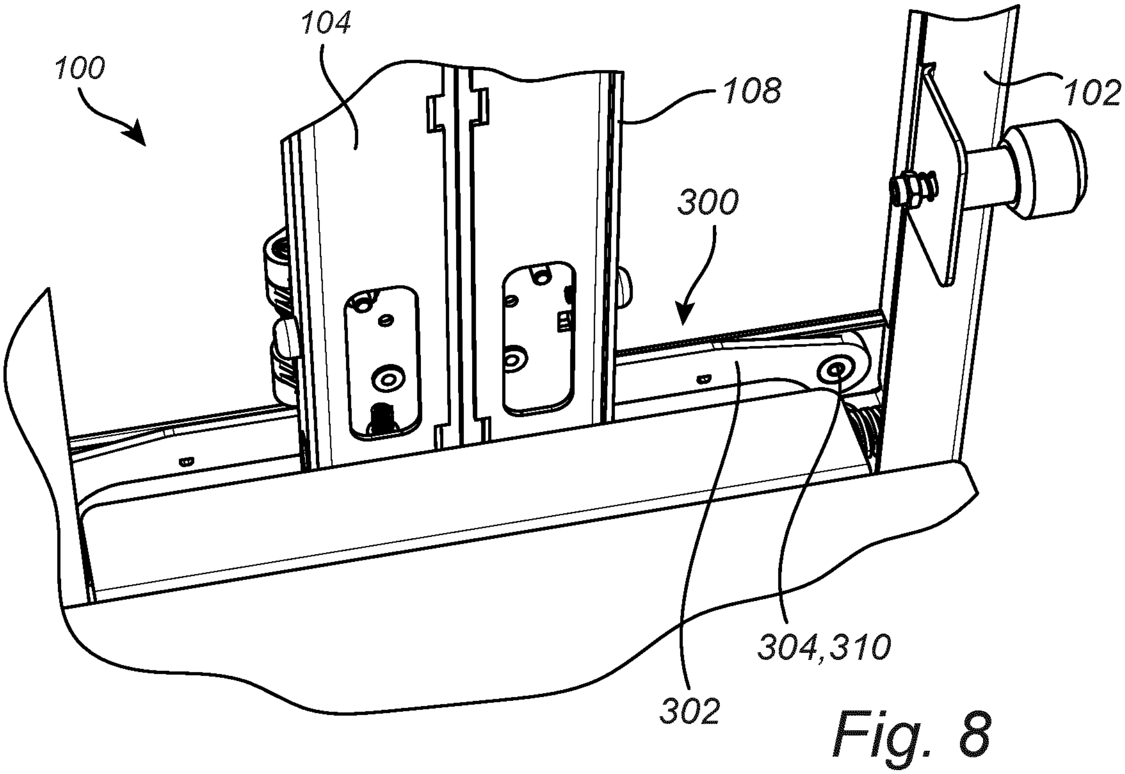
FIG. 8 discloses a bottom view of a cash bag sealing device and a cash bag fastener control mechanism.

With simultaneous reference to FIGS. 6, 7, 8, 9 and 10 examples of how movement of the cash bag fastener 200 can be achieved will be described. In FIG. 6, it is shown that the cash bag fastener 200 may comprise a protrusion 208 fixedly attached to the clamping portion 202, forming a lever arm around the hinge 220 of the fastener 200 and is configured for engagement with a moveable portion 302 of a cash bag fastener control mechanism 300 which is shown in FIG. 7. The cash bag fastener 200 shown in FIG. 6 comprises two protrusions 208, one on each side. However, as only the protrusion 208 arranged adjacent to the supporting structure 102 will be active in the control of the cash bag fastener movement, each cash bag fastener 200 may be provided with only one protrusion 208.

The cash bag fastener control mechanism 300 is configured to control the movement of the cash bag fastener 200 it is associated with such that the movement thereof is controlled by the movement of the sealing jaw 104, 106 to which the cash bag fastener 200 is attached. No dedicated active control means such as e.g. an electric motor or actuator is consequently necessary for controlling the movement of the fastener 200 between its open and closed position.

Preferably is one cash bag fastener control mechanism 300 arranged in association with each cash bag fastener 200.

The moveable portion 302 is arranged on the supporting structure 102 such that it will engage the protrusion 208 of the cash bag fastener 200 and the cooperation between the two defines the position of the cash bag fastener 200, or more specifically of the clamping portion 202 thereof as well as the position of the moveable portion 302 as will be elaborated further on in the following.

The moveable portion 302 is in one embodiment attached to the supporting structure 102 in a pivot axis 310 of the moveable portion 302. In one embodiment, the pivot axis 310 is arranged near the open position of the sealing jaw 104, 106 that the moveable portion 302 is arranged to be in association with. The moveable portion 302 may extend longitudinally from the pivot axis 310 towards the sealing position of the sealing jaw 104, 106 it is associated with.

The moveable portion 302 is moveable between a retracted position and an extended position, preferably in a pivoting movement around the pivot axis 210 as illustrated by the arrow in FIG. 7, in relation to the supporting structure 102. The moveable portion 302 is preferably biased into its extended position by means of a spring 304 (shown in FIG. 8).

As the protrusion 208 protrudes in a downwardly direction in relation to the hinge 220 and the extension of the clamping portion 202 is towards the sealing position of the respective sealing jaw 104, 106 in relation to the hinge 202, a force acting on the protrusion 208 in the direction towards the open position of the sealing jaw 104, 106 will give rise to a momentum force that will add to the closing force of the clamping portion 202 and vice versa.

Figure 9:
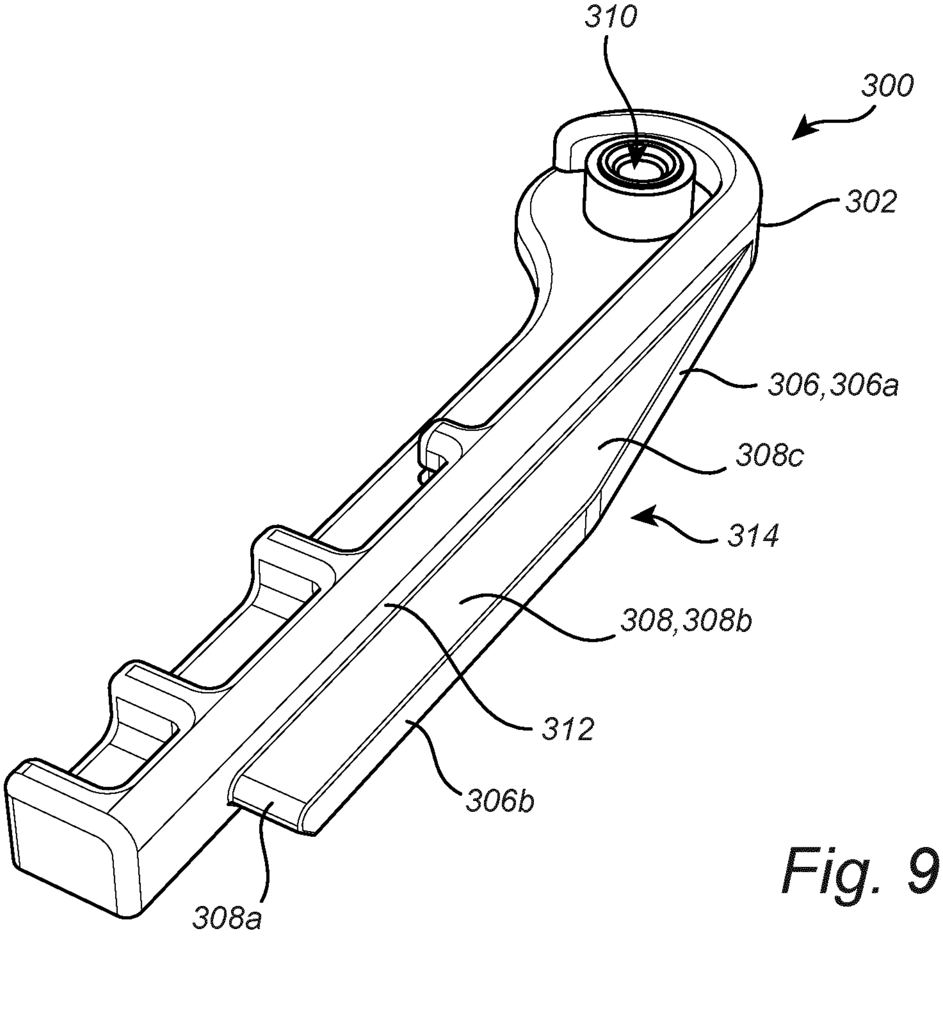
FIG. 9 discloses a perspective view of a moveable portion of a cash bag fastener control mechanism.
Figure 10:
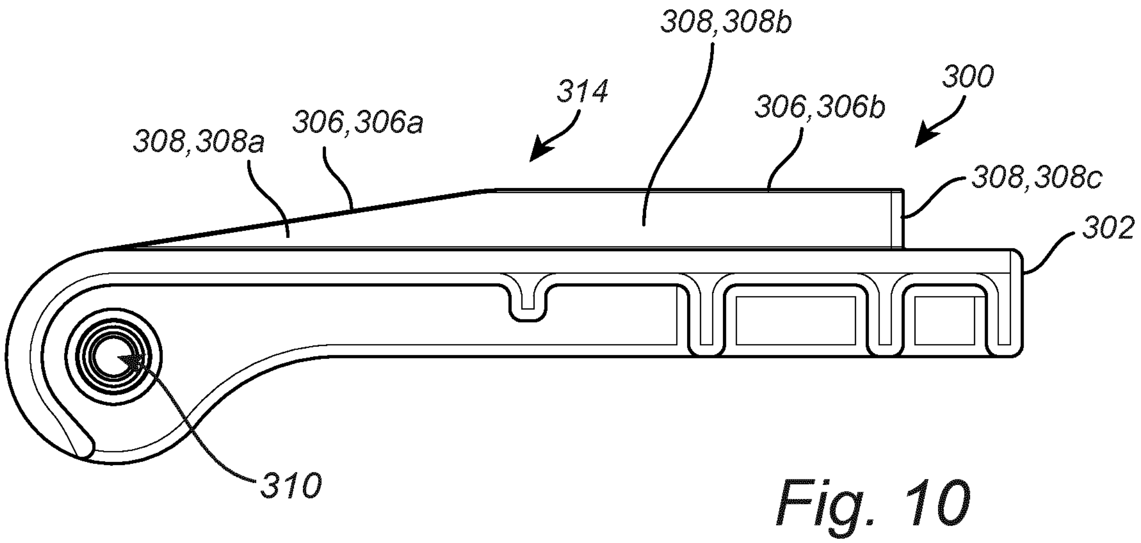
FIG. 10 discloses a top view of a moveable portion of a cash bag fastener control mechanism.

During the movement of the sealing jaw(s) 104, 106 from the open position to the sealing position, the protrusion 208 will push against a first cam surface 306 provided on the moveable portion 302. The first cam surface 306 may be provided on a laterally protruding element 314 of the moveable portion 302, which is shown in FIGS. 9 and 10. The laterally protruding element 314 being configured to be arranged in the path of the protrusion 208 on the cash bag fastener 200 as it moves back and forth with the sealing jaw 104, 106.

The moveable portion 302 may further comprise a vertical abutment surface 312 extending in the longitudinal direction/extension of the moveable portion 302 and being arranged at an angle, preferably perpendicularly, to the laterally protruding element 314. The vertical abutment surface 312 is configured to come into contact with the supporting structure 102 and thus limit the extension of the moveable portion 302, or more specifically the laterally protruding element 314 thereof.

The contact between the protrusion 208 and the first cam surface 306 will cause the moveable portion 302 to pivot into its retracted position when the sealing jaw(s) 104, 106 moves from its open position to its sealing position. The first cam surface 306 may comprise a first portion 306*a*, the first portion 306*a* being the portion of the first cam surface 306 which is arranged nearest the pivot axis 310 of the moveable portion 302. The first portion 306*a* may be arranged on a tapering portion of the protruding element 314, whereby the protrusion of the protruding element 314 decreases towards the pivot axis 310. The moveable portion 302 is thereby gradually pushed into its retracted position by the protrusion 208 when the sealing jaw 104, 106 moves towards the sealing position. The first portion 306*a* of the first cam surface 306 may in other words be arranged at an angle in relation to the longitudinal extension of the moveable portion 302 such that a lateral incline is formed by the first portion 306*a*.

The first cam surface 306 may further comprise a second portion 306*b* adjoining the first portion 306*a*, as is shown in FIGS. 9 and 10, which is arranged farther from the pivot axis 310 than the first portion 306*a*. The second portion 306*b* may be arranged essentially parallel to the longitudinal extension of the moveable portion 302. In FIG. 6, it shown that the protrusion 208 may comprise a first protrusion abutment surface 222. The first protrusion abutment surface 222 is arranged such that it is essentially vertically oriented, parallel to and configured to face the first portion 306*a* of the first cam surface 306, increasing the contact surface area between the first portion 306*a* and the protrusion 208 which reduces wear. I.e. the first protrusion abutment surface 222 is arranged at an angle in relation to the movement direction of the sealing jaw 104, 106. The first abutment surface 222 may in one embodiment comprise a rounded vertically extending surface facing the first portion 306*a*.

The protruding element 314 has a longitudinal extension on the moveable portion 302 which is less than the distance from the pivot axis 310 to the protrusion 208 on the cash bag fastener 200 it cooperates with when the sealing jaw 104, 106 is in the sealing position. The protrusion 208 will consequently, during the movement of the sealing jaw 104, 106 to which it is associated with, move beyond the protruding element 314 and effectively release the moveable portion 302 from its retracted position to its extended position.

The moveable portion 302 is then configured to be arranged in its extended position when the sealing jaw 104, 106 moves towards the open position from the sealing position, the moveable portion 302 will then hold the cash bag fastener 200 in its open position for at least a portion of the length of the movement of the reciprocally moveable sealing jaw 104, 106 from the sealing position to the open position. Preferably, each cash bag fastener 200 is opened when the sealing jaw 104, 106 to which it is attached is in or adjacent to the sealing position to avoid ripping and facilitate releasing of the cash bag 1 that is attached to the cash bag fasteners 200. I.e. the distance between the protruding element 314 and the protrusion 208 in the movement direction of the sealing jaw(s) 104, 106 should be as small as possible when the sealing jaw(s) is in the sealing position.

The protrusion 208 will come into contact with a second cam surface 308 on the moveable portion 302 as the sealing jaw 104, 106 moves from the sealing position towards the open position. The second cam surface 308 may further be arranged on the protruding element 314. A rounded end surface of the protruding element 314 forms a rounded portion 308*a* of the second cam surface 308 which the protrusion 208 comes into contact with first. The rounded portion 308*a* contributes to reducing the wear and may thus increase the durability of the interface between the cash bag fastener 200 and the control mechanism 300. The rounded portion 308*a* will force the cash bag fastener 200 into its open position as it pushes against the protrusion 208. The force from the cash bag fastener 200 on the moveable portion 302 will not cause the moveable portion to pivot into its retracted position as the rounded portion 308*a* extends essentially perpendicularly to the direction of movement of the sealing jaws 104, 106 and as the protruding element 314 is arranged in relation to the pivot axis such that a force from the protrusion 208 on the rounded portion 308*a* generates a moment towards the extended position of the moveable portion 302.

The protrusion 208 will then in the continued movement of the sealing jaw(s) 104, 106 slide against a vertically facing portion 308*b* of the second cam surface 308, which transfers into a tapering portion 308*c* defined by the tapering shape of the protruding element 314. The protrusion 208 will pass the tapering portion 308*c* and will come out of engagement with the moveable portion 302, specifically with the protruding element 314 thereof, once the sealing jaw 104, 106 is near or reaches its open position. The cash bag fastener 200, or the clamping portion thereof 202, will consequently be automatically arranged in its closed position once again when the sealing jaw 104, 106 is in the open position. The clamping portion 202 of the cash bag fastener 200 can however in the open position of the sealing jaw 104, 106 freely be moved by an operator into the open position in order to allow attachment of a new cash bag 1 to the fastener 200.

Figure 11:
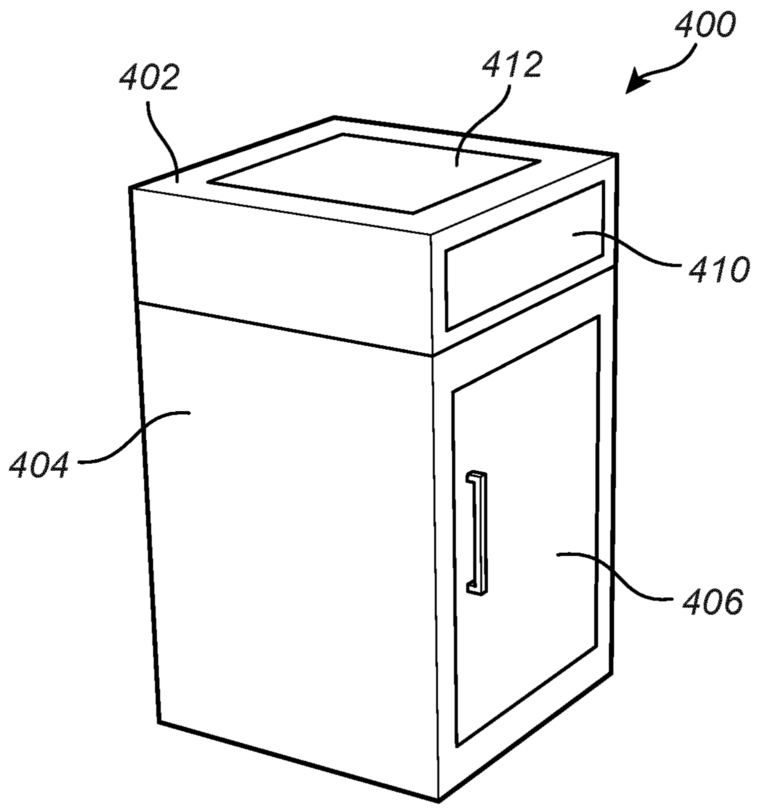
FIG. 11 discloses a perspective view of a cash depositing system.
Figure 12:
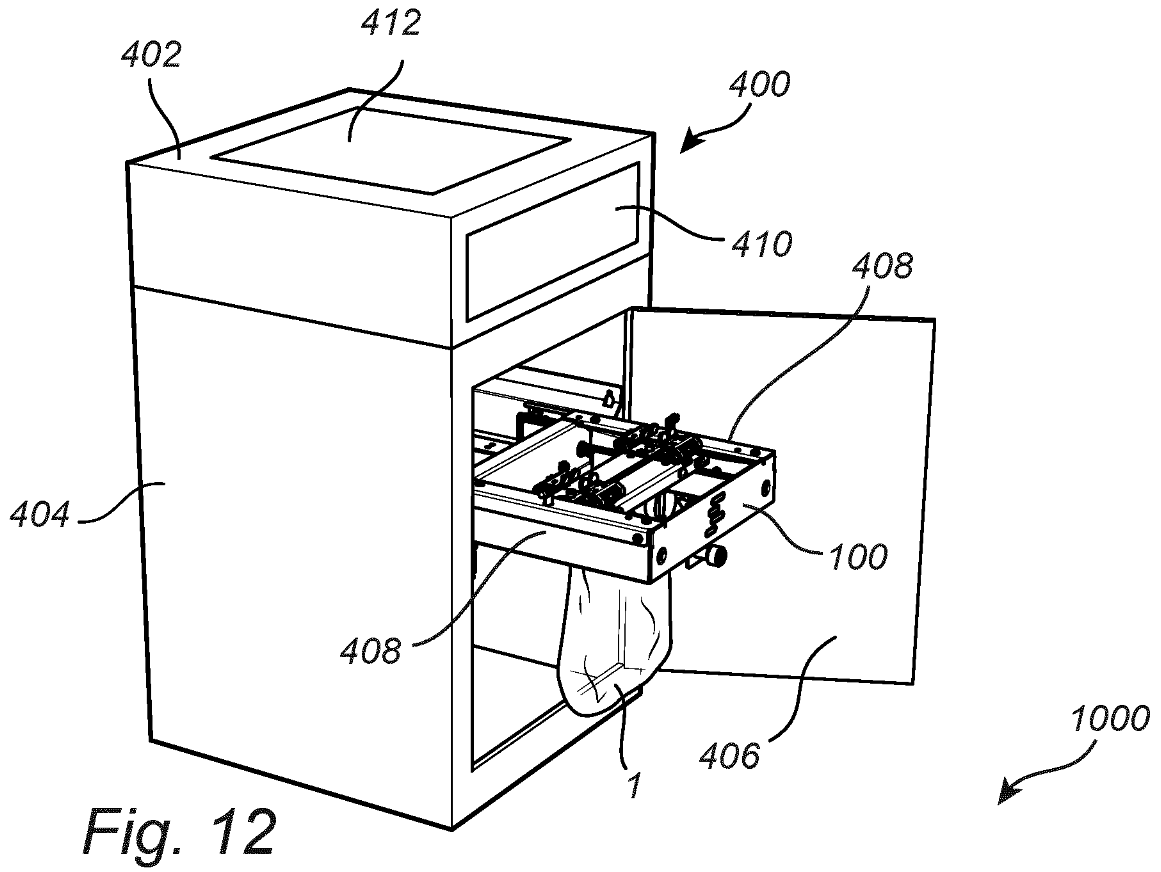
FIG. 12 discloses a perspective view of a cash depositing system with the cash bag sealing device extended.

Turning now to FIGS. 11 and 12, in which a cash depositing system 400 is shown. The cash depositing system 400 is configured for receiving and storing cash preferably in the shape of bills and comprises a cash receiving device 402, a cash storing container 404 and a cash bag sealing device 100 for retaining and sealing a cash bag arranged in the cash storing container 404. The cash receiving device 402 may comprise a cash receiving unit 412 into which cash can be placed for depositing. It may further comprise a cash counter. In one embodiment, the cash depositing system 400 comprises a controller 410. The controller 410 may comprise a user interface, such as a display and/or a control device allowing a user to make inputs and control the cash depositing system 400.

The controller 410 may further comprise a comprises a control unit which may be associated with a memory. The control unit may include a control circuit and an associated processor, such as a central processing unit (CPU), microcontroller, or microprocessor. The processor being configured to execute program code stored in the memory, in order to carry out functions and operations of the cash depositing system 400 and/or of the cash bag sealing device 100.

The memory may be one or more of a buffer, a flash memory, a hard drive, a removable media, a volatile memory, a non-volatile memory, a random access memory (RAM), or another suitable device. In a typical arrangement, the memory may include a non-volatile memory for long term data storage and a volatile memory that functions as system memory for the control unit. The memory may exchange data with the control unit over a data bus. Accompanying control lines and an address bus between the memory and the control unit also may be present.

The control unit may further comprise a communication unit, connected to the control circuit, configured to allow control of the cash bag sealing device 100 remotely and/or as a part of the cash depositing system 400. The communication path over which the communication is made may be wired or wireless. The communication may include data transfers, and the like. Data transfers may include, but are not limited to, downloading and/or uploading data and receiving or sending messages. The data may be processed by the control unit. The processing may include storing the data in a memory, e.g. the memory of the control unit, executing operations or functions, and so forth.

Functions and operations of the control unit may be embodied in the form of executable logic routines (e.g., lines of code, software programs, etc.) that are stored on a non-transitory computer readable medium (e.g., the memory) of the control unit and are executed by the control circuit (e.g., using the processor). Furthermore, the functions and operations of the control unit may be a stand-alone software application or form a part of a software application that carries out additional tasks related to the control unit. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The cash storing container 404 further comprises a hatch 406 which can be opened in order to allow access to the cash bag 1 stored therein. The hatch 406 is shown in its open state in FIG. 12. The cash bag sealing device 100 may be attached to extendable members 408, for instance rails, allowing extension of the cash bag sealing device 100 outside of the opening formed by the open hatch 406 in the cash storing container 404. The cash bag sealing device 100 is shown with its sealing jaws 104, 106 in the sealing position in FIG. 12, however, the present invention allows sealing of the cash bag 1 and arranging of the sealing jaws 104, 106 in the open position before the hatch 406 can be opened.

Figure 13:
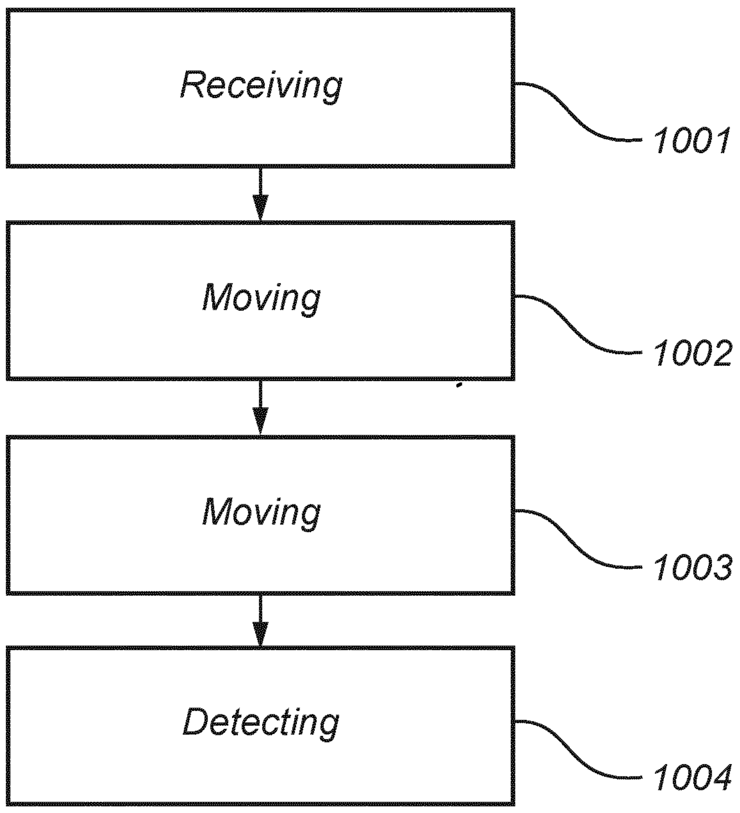
FIG. 13 discloses flow chart of a method for controlling a cash bag depositing system.

In FIG. 13 is a flowchart of a method 1000 for controlling a cash depositing system 400 shown. The method comprises receiving 1001 a signal to seal the bag. For instance, the signal could be signal indicative of a weight of the cash bag 1, an amount of cash that has been deposited in the cash bag 1, a time based signal setting a time for sealing the cash bag and/or a manually activated signal by an operator that desires to seal the cash bag 1.

The at least one moveable sealing jaw 104, 106 is then moved 1002 into the sealing position and the heating element 108 is activated. In one embodiment, both sealing jaws 104, 106 move essentially equidistantly to meet in the sealing position. The seal in the cash bag 1 will be formed by the heat and pressure generated by the sealing jaws 104, 106. The sealing jaw(s) 104, 106 is then moved 1003 into the open position and the heating element 108 is deactivated. The cash bag 1 is as a result sealed and is ready to be collected. The cash bag fasteners 200 are controlled by the movement of the sealing jaws 104, 106 and will thus allow the reciprocal movement of the sealing jaws 104, 106 while reducing the risk of that the cash bag 1 becomes unintentionally released or ripped by a fastener 200 that does not release the bag. It further alleviates some of the work needed in prior art sealing devices where manual release of the cash bag 1 from the sealing jaws 104, 106 is necessary before the sealing jaws 104, 106 can be moved into the open position. Further still, the safety of the system 400 is improved as the sealing process is completed in its entirety in an automated sequence before the cash storing container 404 can be opened.

In one embodiment, the method 1000 further comprises detecting 1004 if the cash bag 1 releases from each cash bag fastener 200 when the at least one moveable sealing jaw 104, 106 moves towards the open position. Each cash bag fastener 200 could be provided with a cash bag detection sensor 218 for the purpose. The cash bag sealing device 100 could when it is detected that the cash bag 1 is not release be configured to stop the movement of the sealing jaw(s) 104, 106 such that ripping of the cash bag 1 is avoided. The cash depositing system 400 could be arranged to provide a signal by means of the controller 410 indicating to an operator that the cash bag 1 has become stuck on one/several of the cash bag fasteners 200. It may further indicate which of the cash bag fasteners 200 that the cash bag 1 fails to release from.

In one embodiment the detecting 1004, by means of the cash bag detection sensor 218, further comprises monitoring continuously if the cash bag 1 is attached to each cash bag fastener 200 when each cash bag fastener 200 is in its closed position. The cash depositing system 400 could thus detect if the cash bag 1 is unintentionally released when the cash bag 1 is arranged in the cash storing container 404. Upon detecting that an unintentional release of the cash bag 1 has occurred, the cash depositing system 400 could be arranged to provide a signal by means of the controller 410 indicating to an operator that the cash bag 1 has become detached and to abort depositing of cash.

It will be appreciated that the present invention is not limited to the embodiments shown. Several modifications and variations are thus conceivable within the scope of the invention which thus is exclusively defined by the appended claims.

The invention claimed is:

1. A cash bag sealing device for retaining and sealing a cash bag into which cash can be deposited and stored, wherein said cash bag sealing device comprises a supporting structure onto which two sealing jaws are oppositely arranged and wherein at least one of the sealing jaws is reciprocally moveable between a sealing position and an open position and wherein at least one of the sealing jaws comprises a heating element, the cash bag sealing device being configured to form a seal in the cash bag by the reciprocally moveable sealing jaw pressing the cash bag against the other sealing jaw in the sealing position and by heating said heating element, and wherein at least one of the sealing jaws comprises at least one cash bag fastener, the at least one cash bag fastener being moveable between an open position in which the cash bag is releasable and a closed position in which the cash bag is retained, and wherein the at least one cash bag fastener is configured to move into its open position when the reciprocally moveable sealing jaw leaves the sealing position after the cash bag has been sealed, wherein the movement of the at least one cash bag fastener into its open position is controlled by the movement of the reciprocally moveable sealing jaw leaving the sealing position.

2. The cash bag sealing device according to claim 1, wherein the at least one cash bag fastener is in the shape of a clamp, the clamp comprising a clamping portion configured to clamp the cash bag towards a clamp engagement portion of the cash bag sealing device when the cash bag fastener is in the closed position.

3. The cash bag sealing device according to claim 2, wherein the clamp engagement portion comprises a retaining protrusion configured to be arranged in a corresponding indentation in the clamping portion when the clamping portion is in a closed position.

4. The cash bag sealing device according to claim 3, wherein the indentation comprises a protrusion configured to be arranged in a corresponding recess on the retaining protrusion.

5. The cash bag sealing device according to claim 1, further comprising at least one cash bag fastener control mechanism having a moveable portion arranged on the supporting structure, wherein the movable portion is moveable between a retracted position and an extended position in relation to the supporting structure, wherein the moveable portion is configured to be arranged in its extended position when the reciprocally movable sealing jaw moves towards the open position from the sealing position, whereby the moveable portion is configured to hold the cash bag fastener in its open position for at least a portion of a length of the movement of the reciprocally moveable sealing jaw from the sealing position to the open position.

6. The cash bag sealing device according to claim 5, wherein the moveable portion is pivotable in relation to the supporting structure between its retracted and extended position and biased by a spring into its extended position, the at least one cash bag fastener pushing against a first cam surface on the moveable portion thereby forcing the moveable portion into the retracted position during the movement from the open position to the sealing position of the reciprocally moveable sealing jaw.

7. The cash bag sealing device according to claim 6, wherein the first cam surface extends such that the moveable portion is configured to return to its extended position when the at least one reciprocally moveable sealing jaw is in or close to the sealing position.

8. The cash bag sealing device according to claim 6, wherein the cash bag fastener comprises a protrusion forming a lever arm configured for engagement with the moveable portion.

9. The cash bag sealing device according to claim 5, wherein the moveable portion comprises a second cam surface configured to engage the at least one cash bag fastener to hold said cash bag fastener in its open position for at least a portion of the length of the movement of the at least one reciprocally moveable sealing jaw from the sealing position to the open position.

10. The cash bag sealing device according to claim 1, wherein each cash bag fastener comprises a cash bag detection sensor configured for detection of whether a cash bag is being retained by the cash bag fastener.

11. The cash bag sealing device according to claim 1, wherein each sealing jaw is reciprocally moveable such that the sealing jaws move in the opposite direction to meet in the sealing position.

12. A cash depositing system configured for receiving and storing cash, the cash depositing system comprising a cash receiving device, a cash storing container and a cash bag sealing device according to claim 1, for retaining and sealing a cash bag arranged in the cash storing container.

13. A method for controlling a cash depositing system according to claim 12, the method comprising:

receiving a signal to seal the cash bag, moving the at least one reciprocally moveable sealing jaw into the sealing position and activating the heating element, moving the at least one reciprocally moveable sealing jaw into the open position and deactivating the heating element.

14. The method according to claim 13 further comprising detecting by means of a cash bag detection sensor if the cash bag releases from each cash bag fastener when the at least one reciprocally moveable sealing jaw moves towards the open position, and/or wherein the detecting further comprising monitoring continuously if the cash bag is attached to each cash bag fastener when each cash bag fastener is in its closed position.

15. A cash bag sealing device for retaining and sealing a cash bag into which cash can be deposited and stored, the cash bag sealing device comprises a supporting structure onto which first and second sealing jaws are oppositely arranged, at least the first sealing jaw being reciprocally moveable between a sealing position and an open position, at least one of the sealing jaws including a heating element, the cash bag sealing device being configured to form a seal in the cash bag by the first sealing jaw being moved into the sealing position and pressing the cash bag against the second sealing jaw and by heating the heating element while the cash bag is being pressed against the second sealing jaw, and wherein at least one of the sealing jaws comprises at least one cash bag fastener, the at least one cash bag fastener being moveable between an open position in which the cash bag is releasable and a closed position in which the cash bag is retained, and wherein the at least one cash bag fastener is configured to move into its open position when the first sealing jaw leaves the sealing position after the cash bag has been sealed, wherein movement of the at least one cash bag fastener into its open position is controlled by movement of the first sealing jaw leaving the sealing position.

16. The cash bag sealing device according to claim 15 wherein the second sealing jaw is one of the at least one of the sealing jaws including a heating element.

17. The cash bag sealing device according to claim 15, wherein the second sealing jaw is reciprocally moveable such that the first and second sealing jaws move in opposite directions to meet in the sealing position.

* * * * *